United States Patent
Dietz

[15] 3,650,792
[45] Mar. 21, 1972

[54] METHOD FOR PRODUCING PIGMENTS OF IMPROVED DISPERSIBILITY

[72] Inventor: Albert Dietz, New Martinsville, W. Va.
[73] Assignee: PPG Industries, Inc., Pittsburgh, Pa.
[22] Filed: Aug. 7, 1970
[21] Appl. No.: 62,161

Related U.S. Application Data

[63] Continuation-in-part of Ser. No. 849,894, Aug. 13, 1969, Pat. No. 3,549,396, which is a continuation-in-part of Ser. No. 506,608, Nov. 5, 1965, abandoned.

[52] U.S. Cl............................106/300, 106/288 B, 106/296, 106/297, 106/299, 106/300, 106/304, 106/306, 106/308 N
[51] Int. Cl. ....................C09c 1/00, C09c 1/36, C09c 3/00
[58] Field of Search..................106/288, 296, 297, 299, 300, 106/301, 303, 304, 306, 308

[56] References Cited

UNITED STATES PATENTS

| | | | |
|---|---|---|---|
| 2,742,375 | 4/1956 | Cooke et al. | 106/308 N |
| 3,088,837 | 5/1963 | Prescott et al. | 106/308 N |
| 3,097,219 | 7/1963 | Butter et al. | 106/308 N |
| 3,197,425 | 7/1965 | Konig et al. | 106/308 N |
| 3,354,111 | 11/1967 | Henderson et al. | 106/308 N |
| 3,453,130 | 7/1969 | Feld | 106/300 |

*Primary Examiner*—James E. Poer
*Attorney*—Chisholm and Spencer

[57] ABSTRACT

Pigmentary metal oxides, e.g., titanium dioxide, are treated with an organic amine, e.g., triethanolamine, and an organic nitrogen compound containing an ionizable hydrogen atom attached to the nitrogen atom, the nitrogen atom being flanked by at least one carbonyl group, e.g., ortho-benzosulfimide.

9 Claims, No Drawings

METHOD FOR PRODUCING PIGMENTS OF IMPROVED DISPERSIBILITY

CROSS-REFERENCE TO RELATED APPLICATIONS

The present application is a continuation-in-part application of my application, Ser. No. 849,894, filed Aug. 13, 1969, now U.S. Pat. No. 3,549,396, which was a continuation-in-part application of my application, Ser. No. 506,608, filed Nov. 5, 1965, and now abandoned.

BACKGROUND OF THE INVENTION

Pigmentary metal oxides, such as titanium dioxide, iron oxide and silicon dioxide, have been treated with organic compounds to improve their dispersibility and/or wetting properties in surface coating composition vehicles in which they are used. Usually, the improvement in wetting properties is selective to either oleoresinous vehicles or water. For example, U.S. Pat. No. 2,742,375 discloses that pigments having improved hydrophobic and organophilic properties can be prepared by coating the pigment particles with a small amount of a high molecular weight pyridinium chloride. U.S. Pat. No. 3,004,858 discloses that the dispersibility of dry titanium dioxide can be improved by the use of a non-ionic essentially linear alkylene oxide polymer. Other benefits associated with improved dispersibility from organic treatment are described in U.S. Pat. Nos. 3,097,219 (oxyalkylated carboxylic acid amides), 3,088,837 (pyrollidone) and 3,197,425 (reaction product of a low molecular alkanolamine with a fatty acid having a lipophilic radical of at least 10 carbon atoms).

Other patents dealing with the treatment of pigments with various organic agents include U.S. Nos. 3,015,573; 3,147,130; 3,147,131; 3,172,772; German Pat. No. 1,166,397; and British Pat. No. 973,463. Since most organic treatment of pigments results in a pigment selective to either an oleoresinous or a water vehicle, it is desirable to utilize a treatment that improves a pigment's wettability in both oleoresinous and water systems since such treatment would simplify the manufacturing process and increase customer utility.

BRIEF SUMMARY OF THE INVENTION

It has now been discovered that pigmentary metal oxides, notably pigmentary titanium dioxide, can be organically treated to improve their dispersibility in both oleoresinous and water systems, i.e., provide a pigment with both oleophilic and hydrophilic properties. More specifically, and in accordance with the present invention, pigmentary inorganic metal oxides are treated with an amine and an organic nitrogen compound having an ionizable hydrogen atom and at least one carbonyl group attached to the nitrogen atom thereof. In particular, the present invention is directed to the treatment of metal oxides with an organic amine and ortho-benzosulfimide, more commonly referred to as saccharin.

DETAILED DESCRIPTION

The present invention relates to pigmentary metal oxides of improved dispersibility, dispersion stability and improved oleophilic and hydrophilic properties and to a method for producing said pigments. The present invention relates particularly to pigmentary metal oxides having the aforesaid improved properties, notably pigmentary titanium dioxide, as a consequence of the presence thereon of the reaction product of a proton-donating organic nitrogen compound and an amine.

As used herein, the term "metal oxide" is intended to means and include the so-called metalloid oxides. Examples of metal oxides to which the process of the present invention can be applied include the oxides of aluminum, arsenic, beryllium, boron, cadmium, cobalt, gadolinium, germanium, hafnium, lanthanum, nickel, iron, samarium, scandium, silicon, strontium, tantalum, tellurium, terbium, thorium, thulium, tin, titanium, yttrium, ytterbium, zinc, zirconium, niobium, gallium, antimony, and lead. Particularly preferred are the oxides of aluminum, boron, cobalt, nickel, iron, silicon, tin, titanium, zinc, zirconium, antimony and lead.

For the purposes of simplicity and brevity, the present discussion will be limited to the treatment of titanium dioxide which is, at present, the chief white pigment of commerce.

Pigmentary titanium dioxide is currently produced commercially by two principal processes. One process involves the vapor phase reaction of a titanium halide, i.e., the chloride process. The other process involves the acid digestion and hydrolysis of a titaniferous ore, i.e., the sulfate process. The chloride process characteristically involves the vapor phase oxidation of at least one titanium halide, particularly, a titanium tetrahalide, selected from the group consisting of titanium tetrachloride, titanium tetrabromide and titanium tetraiodide. Titanium tetrafluoride is not considered generally to be useful for this process.

Typical vapor phase oxidation and/or hydrolysis processes are described in U.S. Pat. Nos. 1,885,934 to Mayer; 2,450,156 to Pechukas; 2,502,347 to Schaumann; 2,791,490 to Willcox; 2,760,275 to Olson et al.; 2,968,529 to Wilson; 3,068,113 to Strain et al.; 3,069,281 to Wilson; British Pat. No. 876,672; and British Pat. No. 726,250.

A vapor phase reaction process may be conducted within or in combination with a fluidized bed as disclosed in U.S. Pat. Nos. 2,760,846 to Richmond; 2,856,264 to Dunn, Jr.; 2,964,386 to Evans et al., 3,022,137 to Nelson; 3,036,926 to Hughes; 3,073,712 to Wigginton et al., and 3,097,923 to Walmsley.

The sulfate process characteristically involves producing a titanium hydrate by the hydrolysis of a titanium sulfate solution and calcination of the hydrate to produce titanium dioxide pigment. Typical sulfate processes are disclosed in U.S. Pat. Nos. 2,505,344; 2,766,133; 2,933,408 and 2,982,613.

The titanium dioxide pigment benefitted by the process described herein includes all types and grades of titanium dioxide irrespective of the manner by which it is prepared for the reason that the present process is directed to the treatment of the surface of the pigment. Specifically included are titanium dioxide containing small amounts of alkali and/or alkaline earth metals, e.g., potassium, calcium and magnesium, or the oxides or inorganic salts thereof as conditioning agents; the compounds of other metals such as antimony, chromium and zinc as brighteners; rutilizing agents such as aluminum or zirconium; particle size regulators such as silicon and potassium; and various conventional hydrous metal oxides, e.g., the hydrous metal oxides of aluminum, titanium, zirconium, silicon, etc., as surface coating agents that improve the pigmentary properties of the pigment. The amount of the aforesaid added materials is normally small and usually represents less than 25, more usually less than 15, weight percent of the pigment. The invention is further usefully applied to titanium dioxide pigment containing extender material such as calcium sulfate, barium sulfate, lithopone, etc.

In accordance with the present process, a pigmentary metal oxide, notably titanium dioxide, is treated with the reaction product of an organic amine and a proton-donating organic nitrogen compound wherein said proton and at least one carbonyl group $$(>C=O)$$

is attached to the nitrogen atom of said nitrogen compound. The proton, i.e., hydrogen atom, can be attached to the nitrogen atom or in tautomeric equilibrium therewith, i.e.,

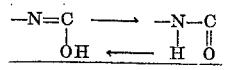

The aforesaid treatment produces a pigment with improved oleophilic and hydrophilic properties, i.e., it improves the wettability of the pigment in both oleoresinous and water systems, and especially improves the dispersibility and dispersion stability of the pigment as measured by the Hegman texture gage, gloss, tint efficiency and other pigment performance tests. By dispersion stability is meant that a pigment treated in accordance with the present process exhibits less deterioration of dispersion during storage than untreated pigment.

The above-described pigment treatment can be accomplished by any convenient method that provides intimate contact of the surface of the pigment with the amine and proton-donating organic nitrogen compound. Thus, the treatment can be effected independently of or as an incident to conventional physical or chemical processing of the pigment, i.e., prior to, during or subsequent to a stage of said conventional processing.

In one particular embodiment, the pigment can be fluid energy milled in the presence of one or both of the organic compounds that will be described in more detail hereinafter. In the former case, a second milling in the presence of the other organic compound is performed. By slowly metering the organic compound(s) into the mill simultaneously with the introduction of the pigment therein, the organic compound(s) are spread over the surface of the pigment by means of the particle movement and collisions produced in a fluid energy mill.

In another embodiment, the pigment can be slurried in a suitable solvent, e.g., water or ethanol, in the presence of one or both of the organic compounds. By suitable solvent is meant a material that acts as a solvent for both of the organic compounds and is chemically compatible with the pigment. In addition, the solvent should be easily removable by, for example, drying the pigment. In a particular embodiment, it is contemplated slurring the pigment in the presence of the organic compounds subsequent to the coating of the pigment with hydrous metal oxides. In still another embodiment, pigment is recovered from a slurry by evaporation, spray drying, filtration or other equivalent means and dried in the presence of the organic compounds. In such embodiment, the organic compounds may be added to the slurry before the pigment is recovered therefrom, or incorporated with the pigment subsequent to recovery from the slurry.

Further contemplated embodiments of this invention include, not by way of limitation, physically processing the pigment in the presence of the organic compounds. Thus, a pigment slurry can be subjected to hydroseparation, milling or otherwise classified in the presence of the organic compounds.

In a preferred embodiment of this invention, titanium tetrachloride is reacted with oxygen in the vapor phase to produce pigmentary titanium dioxide. The pigment is recovered, slurried in water, classified by hydroseparation, and coated in aqueous slurry with one or more hydrous metal oxides, e.g., the hydrous metal oxides of titanium, silicon, aluminum, boron, zinc, zirconium and mixtures thereof. The hydrous oxide coated pigment is then contacted with the organic agents by the addition of the organic agents to the slurry. The pigment is then recovered from the slurry and dried. It is also contemplated that the hydrous oxide coated pigment be recovered first from the slurry and then organically treated.

The practice of the present process is typically carried out at temperatures of less than 300° C., usually from 20° to 250° C. at ambient pressure. Higher temperatures, however, can be used, particularly when the pigment slurry is heated and digested under high pressures. Likewise, higher temperatures can be attained when the pigment is contacted with the organic treating agents in a fluid energy milling operation (e.g., with superheated steam or an inert gas such as nitrogen) or when the pigment is being heat neutralized with superheated steam or $NH_3$. Likewise, temperatures below 20° C. can be used if desired. In any case, the temperature of treatment should be below the temperature at which the pigment tends to discolor (in the absence of the organic treating compounds). Generally, temperatures of less than 650° C., usually below 550° C., do not encounter any significant discoloration.

The amount of proton-donating organic nitrogen compound used can vary over a broad range; but, typically will be only that amount required to improve the dispersibility of the pigment. Typically, from 0.001 to 10.0 weight percent, preferably from 0.01 to 3.0 weight percent, of proton-donating organic nitrogen compound, based on the weight of pigment treated, is used.

The amount of amine used in combination with the aforesaid proton-donating organic nitrogen compound will also vary as broadly and in the same amounts. Typically, the mole ratio of amine to proton-donating organic nitrogen compound will range from 0.1 to 10.0, more typically from 0.1 to 5.0, and preferably from 0.1 to 1.0. Generally, the total amount of amine and proton-donating organic nitrogen compound, i.e., the reaction product, used varies from 0.002 to 10 weight percent, preferably from 0.02 to 5 weight percent, based on the amount of pigment treated.

The proton-donating organic nitrogen compounds useful in the present process are organic compounds containing an imido group

adjacent to at least one carbonyl group

Preferably, the two covalent bonds of the imido group are satisfied by a carbonyl group and an electron withdrawing group. Most preferably, the electron withdrawing group is another carbonyl group. Thus, the proton-donating organic nitrogen compounds of the present process contain the grouping

and preferably contain the grouping

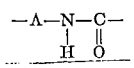

wherein A is an electron withdrawing group such as a carbonyl group, i.e.,

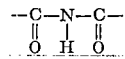

Electron withdrawing groups or atoms are atoms or groups of atoms which have the ability to attract electrons. This property is commonly referred to as electronegativity which has been defined as the power of a chemically bonded atom or group to attract electrons to itself. This concept is used to designate the relative electropositive or electronegative character of an element or group as it appears in a given state of chemical combination. The concept of electronegativity and electron withdrawing groups is well known. Atoms or groups typically characterized as being electronegative or electron withdrawing include: unsaturated linkages, e.g., unsaturated carbon-carbon linkages

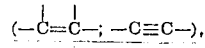

(particularly allylic unsaturation) and imino groups

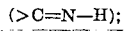

nitro ($O_2N-$) and nitroso ($ON-$) groups; aryl, e.g., phenyl ($C_6H_5-$) groups; carbonyl

groups; sulfonyl ($>SO_2$)

and sulfinyl (sulfoxide)

($>SO$)

groups; nitrile (—CN) groups; phospho ($O_2P$—) and phosphoroso (OP—) groups; mono-, di- and trihalogen containing carbon atoms; and ring halogen substituted aryls, e.g., chlorophenyl. The term halogen is meant to include fluorine, chlorine, bromine and iodine.

The utility of the aforementioned proton-donating organic nitrogen compounds is based on the ability of the imido nitrogen atom to lose or donate its proton which ability is a function of the presence of the electron withdrawing group(s) adjacent to the imido group. In the Lewis concept of acids and bases, the proton-donating organic nitrogen compound is an acid, i.e., an electron acceptor or proton donor. Thus, any nitrogen compound containing the structure

has the ability to donate the proton (H atoms) attached to the imido nitrogen atom and thereby acts as a Lewis acid because of the presence of the adjacent carbonyl group. The remainder of the molecule has little effect on the compound's proton-donating ability and, therefore, any nitrogen compound containing the aforesaid structure can be used in the present process. The presence of an additional adjacent electron withdrawing group, i.e.,

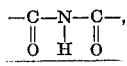

makes the nitrogen compound a stronger Lewis acid, i.e., the proton is more mobile. Thus, electrons associated with the nitrogen atom of the imido group are drawn away from the hydrogen of that group permitting the hydrogen to be mobile (lost) and drawn to a proton accepting molecule, a Lewis base, which in the present process is an amine.

The proton-donating organic nitrogen compounds of the present process can be either open chain or cyclic (including bicyclic) in character. They can be represented by the following general formulas:

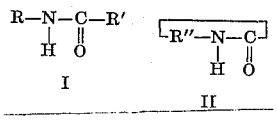

wherein R, R' and R'' can be saturated hydrocarbons, unsaturated hydrocarbons, halogenated hydrocarbons, hydroxy and carbonyl substituted hydrocarbons, aryl, e.g., phenyl groups, and heteroatom containing hydrocarbons. Common heteroatoms include phosphorous, sulfur, oxygen or nitrogen. Such hydrocarbons can be linked to the imido nitrogen atoms or carbonyl carbon atom by a carbon atom, oxygen atom, nitrogen atom, sulfur atom or carbon atom of a carbonyl group. R and R'' may not be hydrogen, hydroxyl, or amino and R' may not be hydroxyl since such groups destroy the proton-donating ability of the imido nitrogen.

In the above formula I, R and R' can each be selected from the group consisting of $C_1$–$C_{24}$, preferably $C_1$–$C_{12}$ alkyl, $C_2$–$C_{24}$, preferably $C_2$–$C_{12}$ alkenyl, $C_2$–$C_{24}$, preferably $C_2$–$C_{12}$ alkynyl, $C_6$–$C_{12}$ aryl, $C_3$–$C_8$ cycloalkyl, $C_3$–$C_8$ cycloalkenyl, $C_6$–$C_{12}$ arylalkyl, $C_6$–$C_{12}$ alkylaryl; $C_6$–$C_{12}$ alkenylaryl and arylalkenyl; $C_6$–$C_{12}$ arylalkynyl; and $C_3$–$C_9$ heterocyclic radicals. In the above formula II, R'' represents the remaining portion of the heterocyclic compound depicted and typically represents from three to six atoms which can be selected from the group consisting of one to six carbon atoms, one to three nitrogen atoms, one to two carbonyl groups and mixtures thereof.

Most preferably, the proton-donating organic nitrogen compounds of the present process are depicted by the following general formulas:

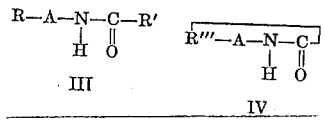

wherein A is an electron withdrawing group, as described above, R and R' are the same as described above and R''' represents from two to six atoms which can be selected from the group consisting of one to six carbon atoms, one to three nitrogen atoms, a carbonyl group and mixtures thereof.

When R and R' are hydrocarbon radicals or heteroatom containing hydrocarbon radicals, it is preferred that each should not exceed 24 carbon atoms, more preferably less than 12 carbon atoms, so that compounds represented by formulas I and III above do not exceed a total of 49 carbon atoms, and preferably are less than 25 carbon atoms.

Typical alkyl radicals that can be substituted for R and R' in the above formulas include: methyl, ethyl, propyl, butyl, pentyl, hexyl, octyl, decyl, hendecyl, dodecyl, octadecyl, 2-ethylhexyl, 2-ethyloctadecyl, 2-nonylhendecyl, and 2-octyldodecyl. Alkenyl radicals that can be used include: 1-ethenyl, 3-butenyl, 4-hexenyl, 6-heptenyl, 8-nonenyl, 10-hendecenyl, 11-dodecenyl, 17-octadecenyl, 19-eicosenyl, 1-methyl-2-propenyl, 2-ethyl-12-tridecenyl, 1-heptenyl-9-decenyl, 2-methyl-18-nonadecenyl, 1,3-pentadienyl, 2-dimethyl-5-hexenyl and 3-chloro-1-butenyl.

Typical alkynyl radicals that can be substituted for R and R' in the above formulas include: 1-ethynyl, 4-pentynyl, 5-hexynyl, 9-decynyl, 12-tridecynyl, 15-hexadecynyl, 19-eicosynyl, 1-methyl-4-pentynyl, 2,2,4-trimethyl-5-hexynyl, and 1-ethyl-17-octadecynyl. Typical cycloalkyl and cycloalkenyl radicals include: cyclopropyl, cyclobutyl, cyclopentyl, cyclohexyl, 3-cyclohexenyl and cyclopentyl.

Typical aryl radicals that can be substituted for R, R' and R''' in the above formulas include: phenyl, p-terphenyl, quinonyl, metaphenylene and naphthyl. Typical arylalkyl and alkylaryl radicals include: benzyl, meta-tolyl, meta-xylyl, 2-phenylpropyl, indanyl, and para-cyclohexyl phenyl. Typical arylalkenyl or alkenylaryl radicals include: beta-styryl, meta-isopropenyl phenyl and para-1-cyclohexenyl phenyl. Typical arylalkynyl or alkynylaryl radicals that can be used include: phenylethynyl and meta-ethynyl phenyl.

Typical heterocyclic radicals that can be used include: benzofuryl, furyl and benzopyranyl. Typical contemplated radicals contailing atoms other than carbon and hydrogen include, but not by way of limitation, the thioalkyls, alkoxys such as phenoxy, benzoyl, acetyl, naphthoyl, salicyl, phenylcarbamido, phthalyl, anthranilo and benzohydryl.

Typical groups of proton-donating organic nitrogen compounds depictable by the aforesaid formulas I, II, III or IV include, not by way of limitation, derivatives of urea, ureides, allophanates, substituted amides, substituted imides, the triazine triones, triazine diones, diazine diones and diazine triones.

Representative examples of organic proton-donating organic nitrogen compounds within the scope of formula I include: $C_6H_5NHCOCH_3$, $CH_3OC_6H_4NHCOCH_3$ (p-methoxyacetanilide), $CH_3CONHC_6H_4SO_3Na \cdot 2H_2O$ (1,3), $CH_3CONHC_6H_4OC_2H_5$ (acetphenetidide including ortho, meta and para), $CH_3C_6H_4NHCOCH_3$ (acettoluidide including ortho, meta and para), o-hydroxyacetanilide, n-acetyl naphthylamide, including alpha and beta, $(CH_3)_2C=NNH\text{-}CONH_2$ (acetone semicarbazone), dimethyl hydantoin, acetyl biuret, ethyl allophanate, n-benzoyl hydroxyl amine, $C_6H_5NH\text{-}COC_6H_5$ (benzanilide), benznaphthalide, phenyl urea, bromoacetanilide (ortho, meta and para), n-acetylaminophenol (ortho, meta and para), $CH_3CONHC_6H_4OH$ (3-acetaminophenol), bromo and chloro acetoacetanilide (ortho, meta and para), bromo and chloro acettoluidide (ortho, meta and para), butyric anilide, carbazide, chloro acetamide, chloro acetanilide (ortho, meta and para), chlorobenzamide (ortho, meta and para), alpha-citral semicarbozone, 3-semicarbazidobenzamide, cyano acetamide, cyano acetanilide (ortho, meta and para) diacetimide, C,N-diacetyl p-aminophenol, diacetyl benzidine, N,N-diacetyl phenylenediamine (ortho and para), N,N′-dibenzoyl ethylenediamine, dibromoacetamide, dichloroacetamide, diethyl ketone semicarbazone, 5-acetamido 1,3-dimethyl benzene, 5,5-diphenyl hydantoin, 1,1-diphenyl semicarbazide, 2,4-diphenyl semicarbazide, symmetrical and unsymmetrical diphenyl urea, phthalimide ethyl allophanate, N-ethyl-N′-phenyl urea, isovaleric anilide, pyrimidone, 2,4,6-trioxypyrimidine (barbituric acid), tribromoacetamide, ortho, meta and para tolyl urea, nitro urea, nitro urethane, para, ortho and meta nitro benzamide, 4-nitro-2-acetnaphthalide, N-acetylurea, veronal, ethylallophanate, decylallophanate, octadecylallophanate, the imide of chlorendic anhydride and ortho-benzosulfimide (saccharin).

Utilized in conjunction with the aforesaid proton-donating organic nitrogen compound for treating the pigment is an amine. In the Lewis acid-base concept, the amine is an electron donor or proton acceptor because of the unshared pair of electrons on the nitrogen atom of the amine. Since all amines have this characteristic, any amine capable of accepting a proton from the proton-donating organic nitrogen compound can be used in the present process.

Amines which are particularly contemplated for use in the process described herein include: $C_1 - C_{20}$ iso and normal primary, secondary and tertiary amines, which include by definition the alkylmonoamines, alkyldiamines, alkyltriamines, alkynylmonoamines, alkynyldiamines, alkynyltriamines, alkenylmonoamines, alkenyldiamines, alkenyltriamines, arylmonoamines, aryldiamines, aryltriamines, arylalkyldiamines and cyclicalkylamines. Preferred are tertiary amines of from one to 10 carbon atoms.

Representative examples of such amines include, not by way of limitation, cyclopentylamine, cyclohexylamine, methylamine, ethylamine, n-propylamine, isopropylamine, n-butylamine, isobutylamine, n-amylamine, isoamylamine, n-hexylamine, iso-hexylamine, laurylamine, hexadecylamine, stearylamine, dimethylamine, diethylamine, di-n-propylamine, di-n-butylamine, di-n-amylamine, di-n-hexylamine, dilaurylamine, dihexadecylamine, trimethylamine, triethylamine, tri-n-propylamine, tri-n-butylamine, tri-n-amylamine, tri-n-hexylamine, trioctylamine, trilaurylamine, trihexadecylamine, dodecylamine, octadecylamine, ethyleneamine, ethylenediamine, triethyleneamine, diethylenetriamine, trimethylenediamine, tetramethylenediamine, pentamethylenediamine, hexamethylenediamine, 1,6-hexanediamine, N-cocotrimethylenediamine, alkylol amines including monoisopropanolamine, methylisopropanolamine, phenylethanolamine, monobutanolamine, monoethanolamine, monopropanolamine, beta-phenylethylamine, dibutanolamine, methylethanolamine, ethylbutanolamine, monomethanolamine, dimethanolamine, trimethanolamine, diethanolamine, dipropanolamine, acetylisobutylamine, di-beta-phenylethylamine, diethylhexanolamine, triethanolamine, tripropanolamine, acetyldiisopropylamine, N-nitrosodimethylamine, N-soyatrimethylenediamine, N-tallowtrimethylenediamine, bis-2-hydroxyethyl soyabean amine, morpholine, N-methyl morpholine, pyridine, 2-methyl pyridine, 4-methyl pyridine, piperidine, 4-picoline, melamine, benzylamine, triphenylamine, tribenzylamine, o-phenylenediamine, p-phenylenediamine and m-phenylenediamine.

In selecting the particular proton-donating organic nitrogen compound and organic amine to be used in the practice of the present process, the relative strength, i.e., acidity (proton donor) and basicity (proton acceptor), of each is taken into consideration. Thus, a weakly acidic proton-donating organic nitrogen compound should be used with a strongly basic amine and vice versa to insure that a reaction, i.e., proton transfer, occurs between the two treating agents. The use of a strongly acidic proton donator and strongly basic amine is preferred. The determination of the relative acidity or basicity of the aforementioned respective compounds is performed by examination of the chemical structure of the particular compound, i.e., by examination of the electronic configurations around the nitrogen atoms of the respective treating agents. Such determinations are well known in the field of chemistry and need not be discussed herein.

A practical method for determining if a reaction (proton transfer) occurs between a particular proton-donating organic nitrogen compound and amine is to mix the two agents and see if there is a change in the water solubility of the mixture. The water solubility can increase or decrease; however, the change in solubility indicates that a reaction has occurred.

Although not intending to be bound by any particular theory, it is believed that the improved dispersibility of pigments treated in accordance with the present process in oleoresinous vehicles is produced by the presence of the organic portion of the reaction product of the proton-donating nitrogen compound and amine on the surface of the pigment. Similarly, the improved dispersibility in water of such pigments, i.e., the hydrophilic character, is produced by the ionic character of the reaction product as a result of the proton transfer discussed above.

In treating pigment with the reaction product of the proton-donating organic nitrogen compound and amine, either agent can be added separately to the pigment or both can be added simultaneously. Preferably, the proton-donating compound is added to the surface of the pigment first, the amine added thereafter and the reaction between the two permitted to occur on the surface of the pigment. In another embodiment, the two reagents can be premixed and the mixture applied to the surface of the pigment. In still another embodiment, a common solvent for both the proton-donating compound and amine can be used to provide a premixture or to aid in the application of each agent to the pigment surface. When a solvent is used, care should be exercised in its selection so that it is not of the type which will interfere or hinder the reaction between the treating agents, hinder the dispersion of the pigment and be difficult to remove from the surface of the pigment. Water and ethanol are exemplary of two solvents that can be used.

The practice of the present process improves the pigmentary properties of the pigment treated. For example, titanium dioxide pigment treated in accordance with this invention characteristically has improved tinting strength, tint efficiency, tint tone, wetting and dispersion characteristics. The tinting strength and tint tone of pigment can be determined by A.S.T.M. Method D-332-26, 1949 *Book of A.S.T.M. Standards, Part IV*, page 31, published by American Society for Testing Materials, Philadelphia 3, Pennsylvania. The tint efficiency, as used herein, refers to the reflectometry method disclosed on pages 704 to 715, Volume 34 of the *Journal of Paint Technology and Engineering*, (Official Digest, July, 1962), now A.S.T.M. Test Method D-2745-687. The wetting characteristics of a pigment refer to the ease of incorporation of the pigment into paint vehicles or vehicle systems. Dispersion can be defined as the ability of a pigment to distribute in a dissimilar substance, particularly a paint vehicle and usually a non-aqueous organic vehicle. In the pigment art, dispersion is frequently referred to as the fineness of grind of pigment as measured by the Hegman gage, (A.S.T.M. Test Method D-1210-D).

Since the present process is generally applied to pigments that typically produce a high Hegman dispersion rating, a test was developed that would discriminate small but significant differences in dispersion. In this test, referred to herein as the Low Shear Dispersion Test, a high quality commercial titanium dioxide pigment that normally yields a dispersion rating of 7½ Hegman in a standard dispersion test is processed to yield from a 5 to 5½ Hegman rating. In this manner, improvements in dispersion by the application of the present process can be readily detected. In this test, increases of from ¼ – ½ of a unit on the Hegman scale are significant. Increases of one unit represent a highly significant improvement.

The Low Shear Dispersion Test used to evaluate dispersion in the examples presented hereinafter was performed in the following manner. Into a mixing container were weighed 115 grams of alkali refined linseed oil 1/ (1/ PPG F. L. Golden Varnish Oil — VD18; Viscosity — A minus or less; Acid Number — 0.5 Max.), 90 grams of mineral spirits 2/ (2/ Distillation range 315° to 390° F.), and 135 grams of pigment to be tested. The container was placed on a Hamilton Beach Blender 3/ (3/ Model No. 936; Impellor used is the clover-leaf type permanently attached to shaft of Model No. 960 Hamilton Beach Blender. Diameter of impeller is 1¼ inch and has a 1-inch clearance from bottom of mixing container which has a height of 7 inches, a top inside diameter of 3 3/16 inches which tapers to a 2½ inch diameter at the bottom.) and the sample milled for 5 minutes at the speed setting marked Medium on the blender. After milling, a portion of the sample was transferred to a 50 ml. tri-pour beaker, stirred there about 1 minute with a glass stirring rod, and the sample paste poured promptly onto the upper channel section of the Hegman gage. The sample paste was then drawn down with a vertically held drawbar at a uniform rate and the gage read in accordance with A.S.T.M. Method D–1210–64. The gage was read within 20 seconds of draw down to avoid solvent evaporation effects. The reading represents the point on the scale adjacent the groove above which there are substantially no particles appearing above the surface of the film. Such reading has been referred to as the secondary grind.

The present process is more particularly described in the following examples which are intended as illustrative only since numerous modifications and variations therein will be apparent to those skilled in the art.

EXAMPLE I

Titanium dioxide prepared by oxidation of titanium tetrachloride with oxygen at about 1,000° C. in the presence of aluminum chloride and silicon tetrachloride (reactor discharge oil absorption of from about 16 to 17) and containing a surface coating of hydrous titania and hydrous alumina was organically treated by intimately mixing a sample thereof in a beaker with a sufficient amount of an aqueous solution containing triethanolamine and ortho-benzosulfimide which were present in a mole ratio of 1:1.1 (amine to imide), to place 0.2 weight percent of the amine-imide reaction product (basis $TiO_2$) on the pigment. The treated pigment was recovered and dried overnight in an oven at about 90° C. After drying, the pigment was fluid energy milled twice at 250 lbs. pressure at a feed rate of 150 grams/minute.

A portion of the dried recovered pigment is gradually mixed with an alkali refined linseed oil vehicle in a Cowles Dissolver (Laboratory Model). The Cowles Dissolver is operated at a blade speed of 2,000 linear feet per minute until all of the pigment has been incorporated into the vehicle. The blade speed is then increased rapidly to 2,550 linear feet per minute. After 10 minutes, the dissolved pigment is removed from the Cowles Dissolver. The fineness of grind is then determined for the pigment using A.S.T.M. Method D–1210–64, Part 21, Jan., 1965. The pigment has a fineness of grind rating of 5 Hegman.

For comparison, a portion of the above hydrous oxide coated pigment which was not organically treated with the triethanolamine-imide solution was processed in the Cowles Dissolver, as above. The fineness of grind for the untreated pigment was 3½ Hegman.

EXAMPLE II

Using the equipment, pigment and procedures of Example I, a further sample of the hydrous oxide coated titanium dioxide pigment was treated with 0.2 weight percent (basis $TiO_2$) of the reaction product of ortho-benzosulfimide and melamine. The pigment was recovered, tested and found to have a fineness of grind rating of 4¾ Hegman.

EXAMPLE III

Portions of the hydrous oxide coated titanium dioxide pigment of Example I was treated separately with 0.2 weight percent (basis $TiO_2$) of ortho-benzosulfimide, triethanolamine and melamine for comparison purposes. The aforementioned treated pigments were found to have fineness of grind ratings of 3½, 3½ and 4½ Hegman.

The data of Examples I – III show that the combined use of ortho-benzosulfimide (a proton-donating organic nitrogen compound) and triethanolamine or melamine (proton-accepting organic amines) improved the dispersibility of pigmentary titanium dioxide over the use alone of the proton-donating compounds or of the organic amines as evidenced by the above-described Low Shear Dispersion Test.

While there are above-described a number of specific embodiments of the present invention, especially in connection with pigmentary titanium dioxide, it is obviously possible to produce other embodiments and various equivalent modifications thereof without departing from the spirit of the invention.

Having set forth the general nature and specific embodiments of the present invention, the scope thereof is now particularly pointed out in the appended claims.

I claim:

1. A process for treating pigmentary metal oxide, which comprises contacting said metal oxide with from 0.002 to 10 weight percent, based on metal oxide, of the reaction product of (a) an organic amine selected from the group consisting of $C_1 - C_{20}$ primary, secondary and tertiary amines, and (b) ortho-benzosulfimide.

2. A process according to claim 1 wherein the pigmentary metal oxide is titanium dioxide.

3. A process according to claim 1 wherein said organic amine is selected from the group consisting of triethanolamine and melamine.

4. A process for treating pigmentary titanium dioxide which comprises contacting said pigment with from 0.002 to 10 weight percent based on titanium dioxide, of the reaction product of ortho-benzosulfimide and an organic amine selected from the group consisting of triethanolamine and melamine.

5. A process according to claim 4 wherein the pigmentary titanium dioxide treated has a hydrous metal oxide coating.

6. The process according to claim 4 wherein the pigment is contacted first with the ortho-benzosulfimide and then with the organic amine.

7. Pigmentary metal oxide having on its surface from 0.002 to 10 weight percent, based on metal oxide, of the reaction product of (a) an organic amine selected from the group consisting of $C_1 - C_{20}$ primary, secondary and tertiary amines, and (b) ortho-benzosulfimide.

8. Pigmentary metal oxide according to claim 7 wherein the oxide is titanium dioxide.

9. Pigmentary titanium dioxide according to claim 8 wherein the organic amine is selected from the group consisting of triethanolamine and melamine.

* * * * *